(12) United States Patent
Tsuge (10) Patent No.: US 8,933,599 B2
(45) Date of Patent: Jan. 13, 2015

(54) COOLING SYSTEM OF ELECTRIC ROTATING MACHINE FOR VEHICLES

(75) Inventor: Takafumi Tsuge, Ena (JP)

(73) Assignee: Denso Corporation, Kariya (JP)

( * ) Notice: Subject to any disclaimer, the term of this patent is extended or adjusted under 35 U.S.C. 154(b) by 93 days.

(21) Appl. No.: 13/187,879

(22) Filed: Jul. 21, 2011

(65) Prior Publication Data
US 2012/0019084 A1  Jan. 26, 2012

(30) Foreign Application Priority Data

Jul. 21, 2010  (JP) ................................ 2010-163726

(51) Int. Cl.
*H02K 9/00* (2006.01)
*H02K 9/06* (2006.01)
*H02K 11/00* (2006.01)
*H02K 5/20* (2006.01)
*H02K 11/04* (2006.01)

(52) U.S. Cl.
CPC .. *H02K 9/06* (2013.01); *H02K 5/20* (2013.01); *H02K 11/048* (2013.01)
USPC .............................. 310/59; 310/62; 310/68 D (58) Field of Classification Search
CPC .............. H02K 9/02; H02K 9/04; H02K 9/06
USPC ....... 310/53, 55, 56, 59, 60, 62, 63, 60 A, 52, 310/58
See application file for complete search history.

(56) References Cited

U.S. PATENT DOCUMENTS

| 4,443,723 | A  | * | 4/1984 | Ohkubo .......................... 310/53 |
| 2002/0047362 | A1 | * | 4/2002 | Nakamura et al. .......... 310/68 R |
| 2002/0135246 | A1 | * | 9/2002 | Lemke et al. .................... 310/89 |
| 2008/0030084 | A1 |   | 2/2008 | Tsuge |

FOREIGN PATENT DOCUMENTS

| JP | 61102149 | A | * | 5/1986 |
| JP | 61102149 | A | * | 5/1986 |
| JP | A-4-17551 |   |   | 1/1992 |
| JP | A-05-219685 |   |   | 8/1993 |
| JP | 06335203 | A | * | 12/1994 |
| JP | A-09-131018 |   |   | 5/1997 |
| JP | A-2002-51593 |   |   | 2/2002 |
| JP | A-2008-043041 |   |   | 2/2008 |

OTHER PUBLICATIONS

Machine translation of Kurahashi, JP-A-09-131018, 1997.*
(Continued)

*Primary Examiner* — Quyen Leung
*Assistant Examiner* — Thomas Truong
(74) *Attorney, Agent, or Firm* — Oliff PLC (57) ABSTRACT

A cooling system of a AC generator for vehicles has a stator with a stator winding, a rotor that is arranged in an inner circumferential side of the stator, a rectifier that converts an alternating current voltage generated in the stator winding into direct current, and a rear cover that covers the rectifier. The rear cover has an intake duct connecting portion that projects outside and an air intake duct is attached to a tip portion of the intake duct connecting portion. A dividing wall that divides an internal space of the rear cover into a plurality of spaces along a direction extending from the rectifier backwardly relative to the direction of rotation is disposed in the intake duct connecting portion.

7 Claims, 7 Drawing Sheets

(56) References Cited

OTHER PUBLICATIONS

Translation of Yagyu et al, JP 61-102149 A, 1986.*
Machine translation of Kenji, JP-A-05-219685, 1993.*
Machine translation of Kurhashi, JP-A-09-131018, 1997.*

English translation of Yagyu et al, JP 61-102149 A, 1996.*
Jun. 26, 2012 Notification of Reasons for Rejection issued in Japanese Patent Application No. 2010-163726 (with translation).
Jan. 29, 2013 Office Action issued in Japanese Patent Application No. 2010-163726 (with translation).

* cited by examiner

COOLING SYSTEM OF ELECTRIC ROTATING MACHINE FOR VEHICLES

CROSS-REFERENCE TO RELATED APPLICATION

This application is based on and claims the benefit of priority from earlier Japanese Patent Application No. 2010-163726 filed Jul. 21, 2010, the description of which is incorporated herein by reference.

TECHNICAL FIELD

The present disclosure relates to a cooling system of a electric rotating machine, an alternating-current generator for example, for vehicles such as a passenger car and a truck.

BACKGROUND

A cooling air passage structure of an alternating-current generator (AC generator) for a vehicle is known (refer to JP 2008-43041, for example). In such a structure, an intake of cooling air flow from a rear side of an engine is avoided in order to improve a coolability of semiconductor elements installed, while securing a quantity of the cooling air flow by suppressing an increase of a fluid loss.

In the AC generator for the vehicle described above, a second rear cover is attached to a back of a first rear cover, and an air intake duct is attached to a side of the second rear cover. The cooling air flow is taken in the second rear cover through the air intake duct.

By the way, in the cooling air passage structure disclosed in JP2008-43041, since the cooling air flow introduced through the air intake duct flows in from the side of the second rear cover, the cooling air flow is taken into the first rear cover from a vicinity of an exit of the air intake duct.

Therefore, the cooling air flow hardly reaches a rectifier arranged in an area far from the exit of the air intake duct, thus arises a problem with an insufficient cooling efficiency.

Moreover, since the first rear cover and the second rear cover are provided, the flow of the cooling air flow taken into the second rear cover is once stopped by the first rear cover, thus arises another problem that the amount of the cooling air decreased because of a growth of ventilation resistance.

Further, the second rear cover attached to the back of the first rear cover has a fixing surface arranged to a position larger than an exterior of a frame excluding p part of a stay.

Therefore the frame requires a part that projects to the exterior side that corresponds to the fixing surface that results a size of an outline to grow partially, and installing manner is deteriorated.

Furthermore, besides the first rear cover equipped in the general AC generator for the vehicle, the second rear cover is needed so that a number of parts increases, and, therefore, there is a problem that an assembly man-hour and a part cost increase.

SUMMARY

An embodiment provides a cooling system of a electric rotating machine for vehicles that an air intake duct can be connected while ventilation resistance is small, and has an excellent cooling efficiency.

The embodiment also provides the electric rotating machine for the vehicles where installing manner can be improved by suppressing an increase in a size of the outline.

The embodiment also provides the electric rotating machine for the vehicles that decreases assembling man-hours and part costs by reducing the number of parts, and improves reliability.

In a cooling system of a electric rotating machine for vehicles according to a first aspect, the cooling system of the electric rotating machine for the vehicles includes a stator around which a stator winding is wound, a rotor that is arranged in an inner circumferential side of the stator, a rectifier that converts an alternating current voltage generated in the stator winding into direct current, and a protecting cover that covers the rectifier.

The protecting cover has an intake duct connecting portion that projects outside in a radial direction relative to a rotating shaft of the rotor, an air intake duct is attached to a tip portion of the intake duct connecting portion, and a dividing wall that divides an internal space of the protecting cover into a plurality of spaces along a direction extending from the rectifier backwardly in an axial direction relative to the rotating shaft is disposed in the intake duct connecting portion.

Since the cooling air taken from the intake duct can be introduced into the internal space by providing the dividing wall, it becomes possible to apply the cooling air to the rectifier etc. covered by the protecting cover, thus the cooling efficiency can be improved.

In the cooling system of the electric rotating machine for the vehicles according to a second aspect, the dividing wall is disposed extending inside from an opening of the tip portion of the intake duct connecting portion.

In the cooling system of the electric rotating machine for the vehicles according to a third aspect, the protecting cover has a plurality of fixing seats arranged in a plurality of places further inside in a radial direction than a surrounding wall of the protecting cover.

In the cooling system of the electric rotating machine for the vehicles according to a fourth aspect, an inside of the intake duct and a surrounding space of the rectifier exclusively communicate together in the internal space of the protecting cover.

In the cooling system of the electric rotating machine for the vehicles according to a fifth aspect, a plurality of parallel dividing walls is formed.

In the cooling system of the electric rotating machine for the vehicles according to a sixth aspect, each of the plurality of dividing walls is arranged extending into the opening from the tip portion of the intake duct connecting portion as it extends from the rectifier.

In the cooling system of the electric rotating machine for the vehicles according to a seventh aspect, the protecting cover has a guiding member that guides a flow of cooling air introduced from the intake duct along the dividing wall.

In the cooling system of the electric rotating machine for the vehicles according to an eighth aspect, a rotational force from a vehicle engine is transmitted to a pulley of the rotor through a belt, and the pulley has a one-way clutch mechanism therein that transmits a driving force only in a direction of the rotational force from the engine.

DETAILED DESCRIPTION OF THE PREFERRED EMBODIMENTS

An embodiment of a cooling system of an alternating-current generator for vehicles (simplified to AC generator hereafter) that the present disclosure is applied will be explained in detail referring to the accompanying drawings.

Figure 1:
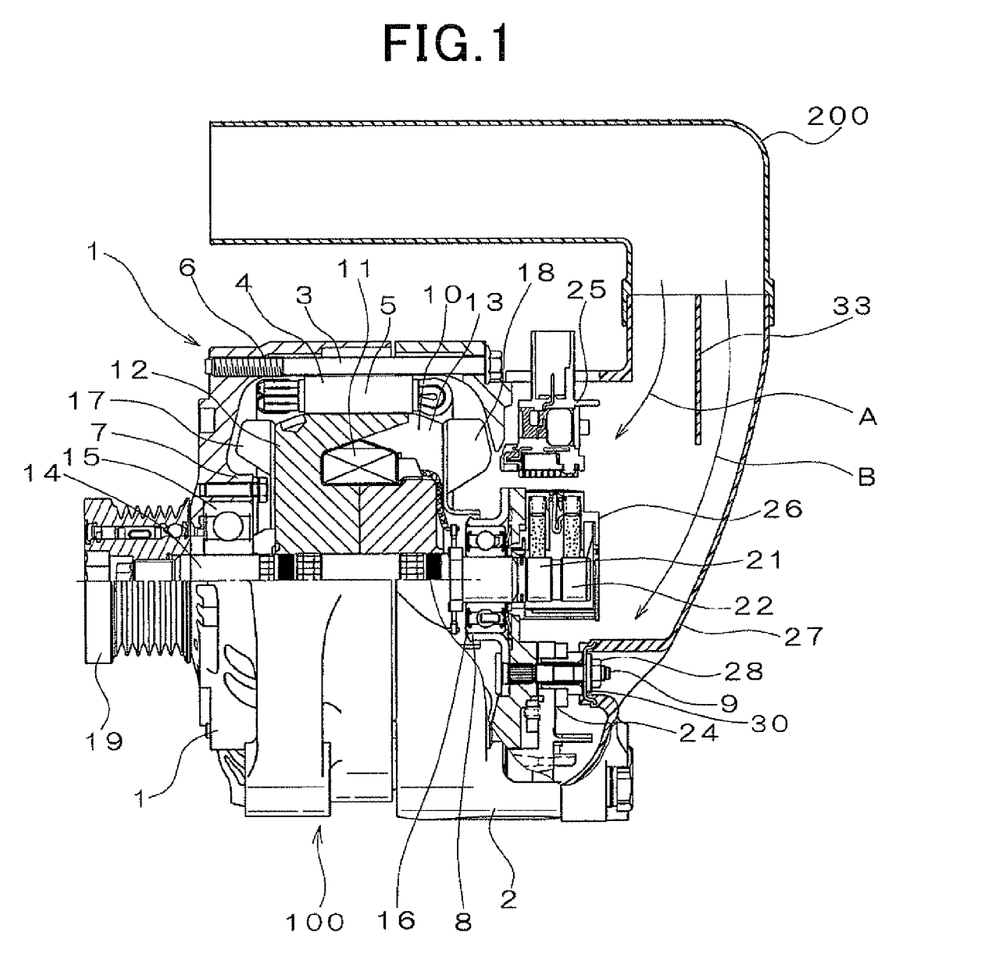
FIG. 1 shows an entire composition of an alternating-current generator (AC generator) for the vehicles in an embodiment.

FIG. 1 shows an entire composition of the cooling system of the AC generator in the embodiment, and shows a state where an air intake duct is connected thereto.

The AC generator 100 shown in FIG. 1 includes a front side frame 1, a rear side frame 2, a stator 4, a rotor 10, a rectifier 24, a voltage regulator 25, a brush device 26, and a rear cover 27, etc.

The front side frame 1 and the rear side frame 2 both has a bowl-like shape, and are fixed mutually with a plurality of bolts 3 in the state where each opening of the frames 1 and 2 faces each other.

The stator 4 is fixed to an inner circumference of the front side frame 1. Moreover, a cylindrical bearing box 7 is formed in the front side frame 1 unitarily, while an iron made bearing box 8 is fixed to the rear side frame 2 with a bolt 9 that has a knurling thereon.

The stator 4 is provided with a stator core 5 and a stator winding 6 that is wound around the stator core 5.

The rotor 10 is provided with a field winding 11, field cores 12 and 13, a rotating shaft 14, etc., and is supported rotationably by a pair of bearings 15 and 16 that are fixed to the bearing boxes 7 and 8.

Cooling fans 17 and 18 of a centrifugal type are attached to ends in an axial direction of the field cores 12 and 13.

The cooling fan 17 on the front side is a mixed flow type fan whose blade is inclined forward relative to a direction in which the rotor 10 is rotated in order to generate a cooling air to the field winding 11.

Moreover, a pulley 19 is disposed at a front end of the rotating shaft 14, and the rotating shaft 14 is driven by an engine of the vehicle, which is not shown.

In addition, a pair of slip rings 21 and 22 is disposed at a rear end of the rotating shaft 14 located outside of the rear side frame 2, and it is electrically connected with the field winding 11.

So-called electric parts such as the rectifier 24, the voltage regulator 25, and the brush devices 26 are fixed to an end surface outside of the rear side frame 2 in an axial direction by a fixing means such as the bolts 9.

The rectifier 24 rectifies a three-phase alternating current voltage that is an output voltage of the stator winding 6 of the three-phase circuit and converts into a direct current output voltage.

Figure 10:
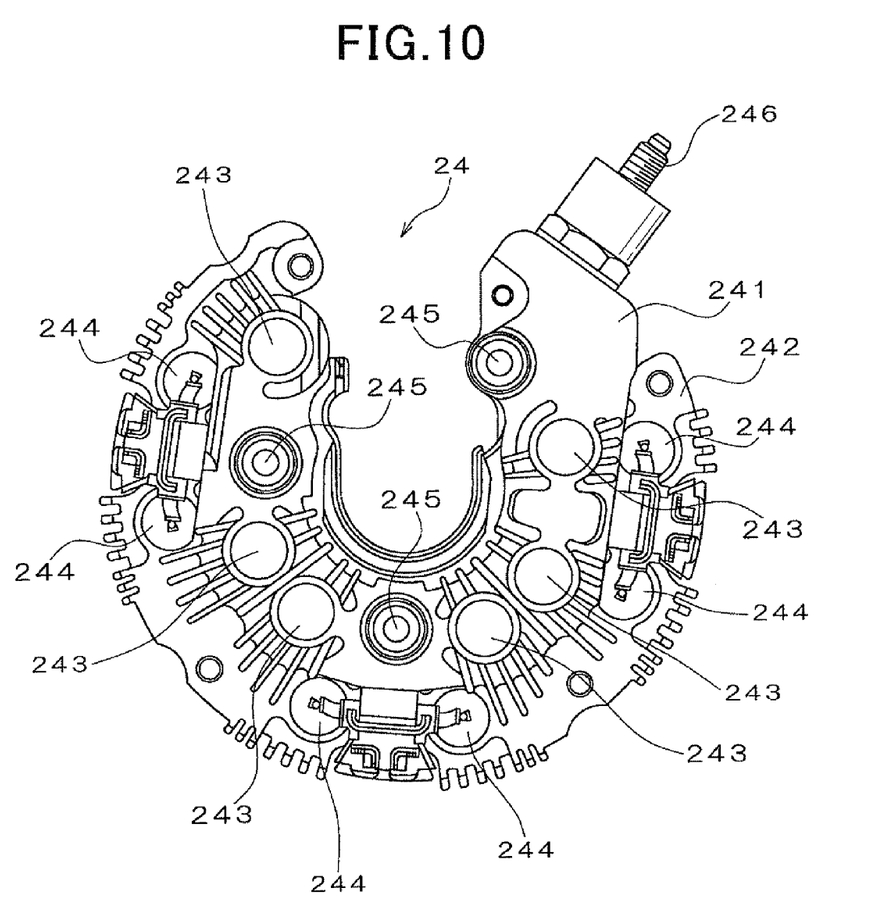
FIG. 10 shows a front elevational view of rectifier seen from the rear cover.

As shown in FIG. 10, the rectifier 24 is provided with heat sinks 241 and 242 on the end surface outside of the rear side frame 2 in the axial direction.

The heat sinks 241 and 242 are arranged extending within a wide range except where the voltage regulator 25 and the brush device 26 are disposed. A plurality of rectification elements 243 and 244 are attached to the heat sinks 241 and 242 by press fitting etc.

The voltage regulator 25 controls an output voltage of the AC generator 100 by adjusting an exciting current that flows to the field winding 11.

The brush device 26 is for causing the exciting current flow into the field winding 11 of the rotor 10 from the rectifier 24, and is equipped with brushes that are pressed to the respective slip rings 21 and 22 formed on the rotating shaft 14 of the rotor 10.

The rear cover 27 is a protecting cover as the shell region made of resin. The rear cover 27 covers and protects the electric parts such as the rectifier 24, the voltage regulator 25, and the brush devices 26 attached outside of the rear side frame 2.

The rear cover 27 has fixing seats 30 (three places, described later). The fixing seats 30 are for fixing the rectifier 24 to the rear side frame 2 by penetrating an installation hole 245 (refer to FIG. 10) of the rectifier 24 to the bolt 9 extending from the rear side frame 2 and tightening a nut 28 thereto. The rectifier 24 is sandwiched between the rear side frame 2 and the fixing seats 30 of the rear cover 27.

These fixing seats 30 are arranged inside in a radial direction than a surrounding wall of the rear cover 27. Details of the rear cover 27 will be described later.

In the AC generator 100 that has the structure mentioned above, the rotor 10 rotates in a predetermined direction when a rotational force from the vehicle engine is transmitted to the pulley 19 through a belt etc.

Under such a condition, each claw portion of the field cores 12 and 13 are excited by supplying an exciting voltage from outside to the field winding 11 of the rotor 10 that generates the three-phase alternating current voltage to the stator winding 6, thus predetermined direct current is taken out from an output terminal 246 disposed in the rectifier 24.

The pulley 19 has a one-way clutch mechanism therein that transmits the driving force only in a direction of the rotational force from the engine.

The AC generator 100 in the present embodiment has such a composition, and a cooling structure that uses the rear cover 27 and the rear cover 27 is explained in detail next.

Figure 2:
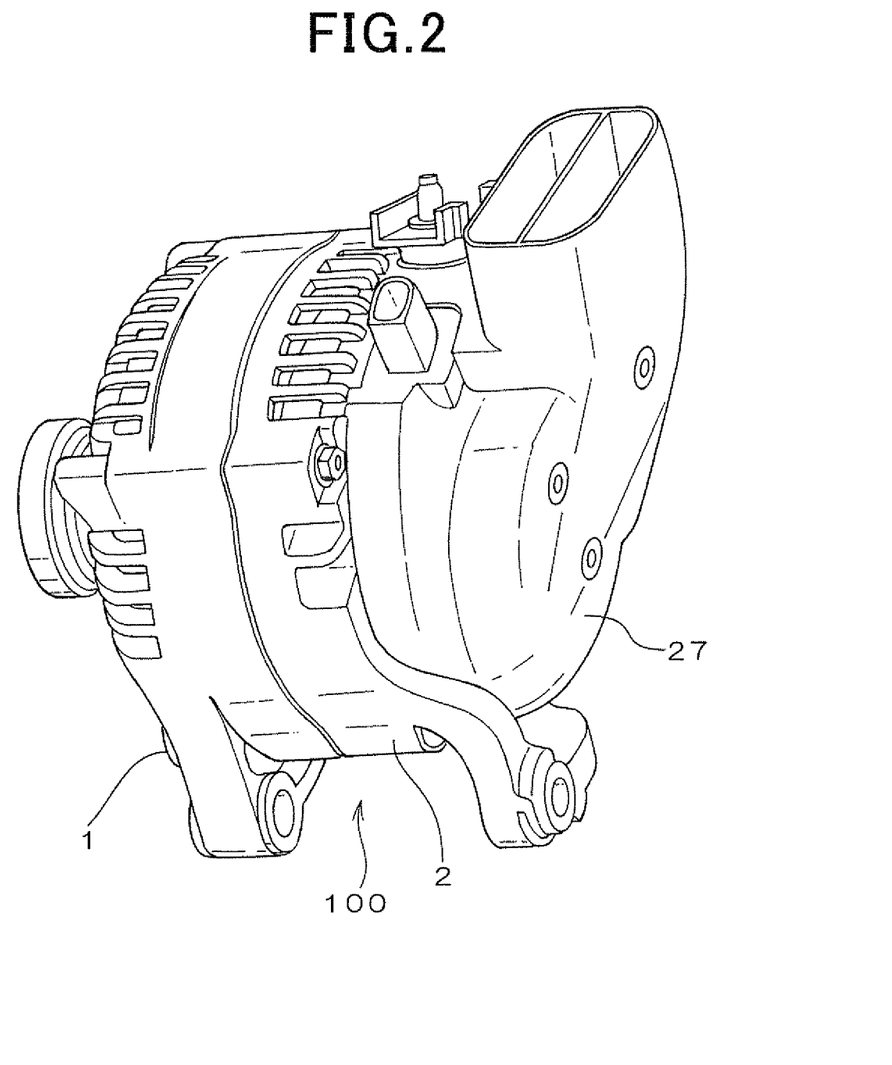
FIG. 2 shows a perspective view of the AC generator for the vehicles seen from behind.
Figure 3:
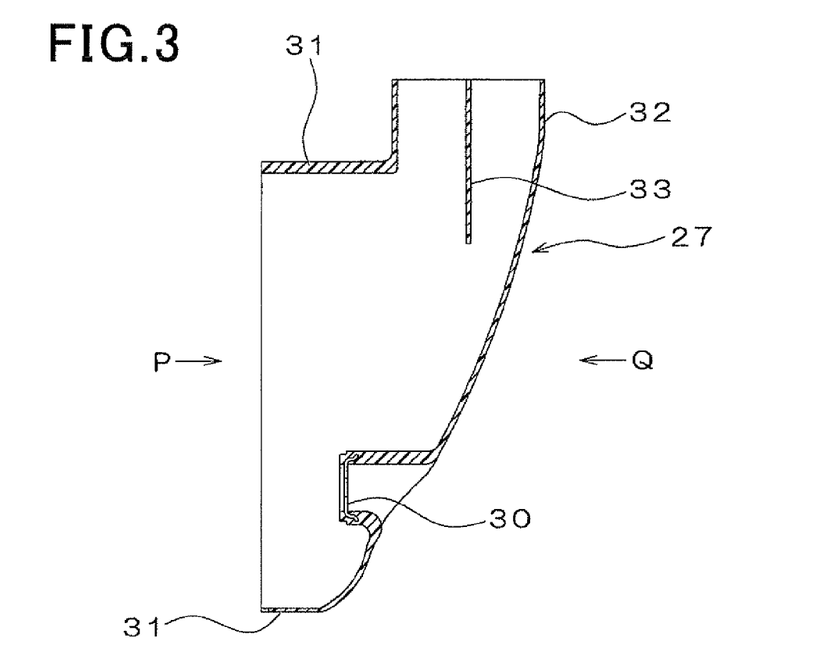
FIG. 3 shows a cross sectional view of a rear cover.
Figure 4:
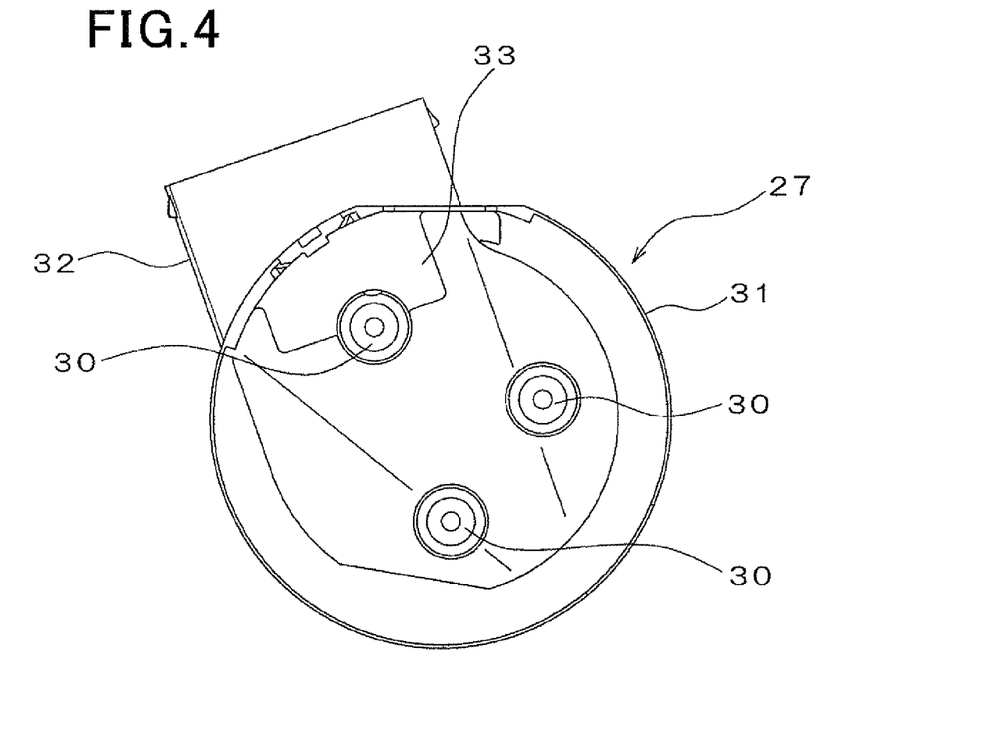
FIG. 4 shows a back side view of the rear cover.
Figure 5:
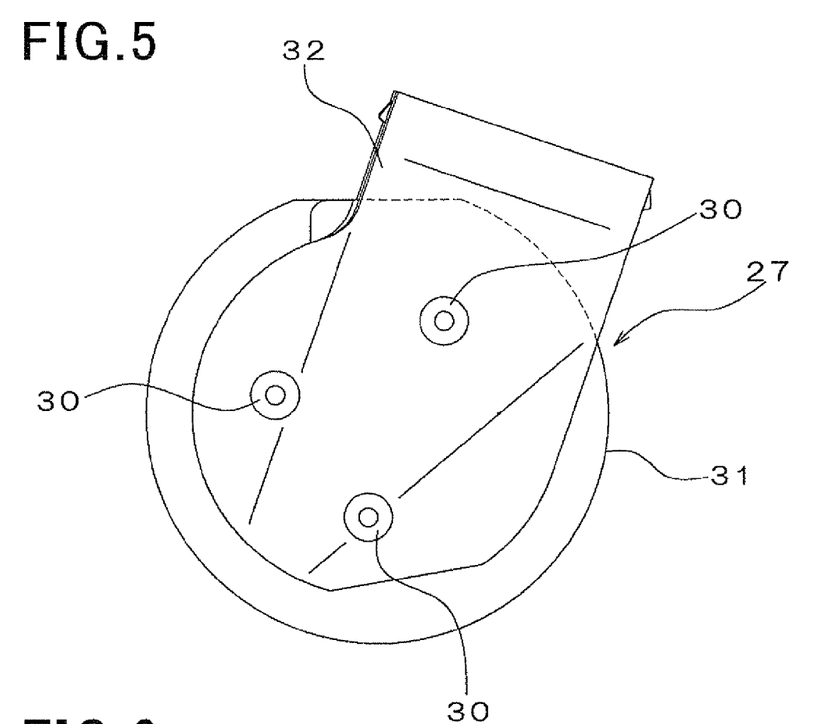
FIG. 5 shows a plan view of the rear cover.
Figure 6:
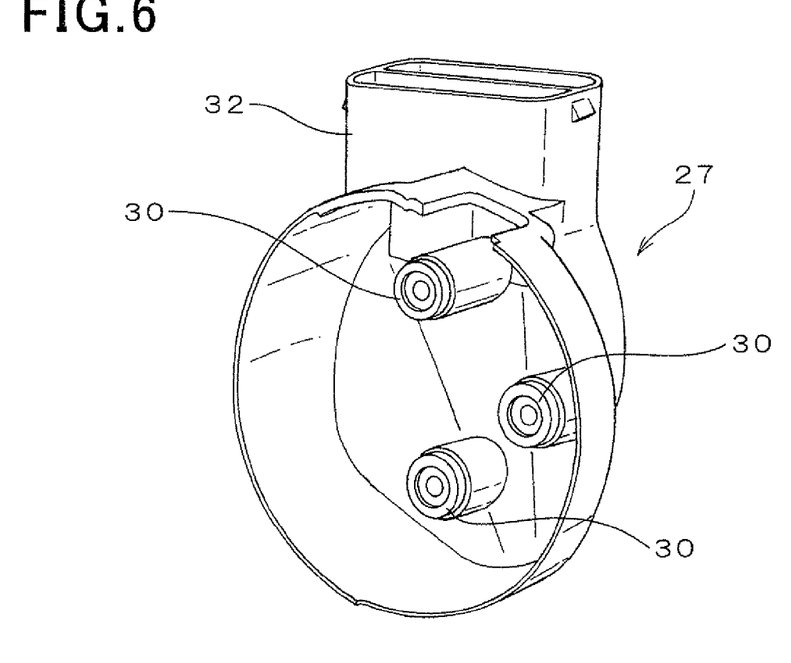
FIG. 6 shows a perspective view of the rear cover.

FIG. 2 is a perspective view seeing the AC generator 100 from the rear side, while FIG. 3 is a sectional view of the rear cover 27. Moreover, FIG. 4 is a back side view of the rear cover 27 showing a shape seen from a direction of P in FIG. 3. Further, FIG. 5 is a plan view of the rear cover 27 showing a shape seen from a direction of Q in FIG. 3, while FIG. 6 is a perspective view of the rear cover 27.

As shown in these figures, the rear cover 27 has a surrounding wall 31 located in an outer circumference of the electric parts such as the rectifier 24 etc., and an intake duct connecting portion 32 that is formed by inclining while projecting in one direction a bottom part surrounded by the surrounding wall 31.

As shown in FIG. 1, an intake duct 200 is attached to a tip portion of the intake duct connecting portion 32.

The tip portion of the intake duct connecting portion 32 has a rectangular sectional shape and is projected in a radial direction, while a dividing wall 33 is disposed therein that extends from the surrounding wall 31 to radially inside from an opening of the tip portion toward inside.

An internal space of the intake duct connecting portion 32 is divided into a plurality of spaces by the dividing wall 33 along the direction extending from the rectifier 24 backwardly.

For example, as shown in FIG. 1 etc., the internal space of the tip portion of the intake duct connecting portion 32 is divided into two when one dividing wall 33 is disposed.

As shown in FIG. 1, in the internal space of the tip portion of the rear cover 27, an inside of the intake duct 200 and a surrounding space of the electric parts such as the rectifier 24 etc. exclusively communicate together.

When the rear side cooling fan 18 rotates together with the rotor 10, a negative pressure is generated behind the cooling fan 18 so that the cooling air is taken into the intake duct connecting portion 32 of the rear cover 27 through the intake duct 200.

Since the inside of the intake duct connecting portion 32 is partitioned by the dividing wall 33, the cooling air taken in front of the dividing wall 33 (side near the rectifier 24 etc.) is introduced to an area near the intake duct 200 (an induction route of this cooling air is shown by an arrow A in FIG. 1).

Moreover, the cooling air taken behind the dividing wall 33 (side far from the rectifier 24 etc.) is introduced to an area far from the intake duct 200 (an induction route of this cooling air is shown by an arrow B in FIG. 1).

Further, these cooling airs are introduced directly toward the electric parts without involving other members.

As described above, since the cooling air taken from the intake duct 200 can be introduced into the internal space by disposing the dividing wall 33 in the intake duct connecting portion 32 of the rear cover 27 in the AC generator 100 of the present embodiment, it becomes possible to apply the cooling air to the entire electric parts such as the rectifier 24 etc. covered by the rear cover 27, and the cooling efficiency can be improved.

Since the rear cover 27 has the plurality of fixing seats 30 arranged in the plurality of places (three places) in the radially inside of the surrounding wall 31, portions projecting in the radially outside of the surrounding wall 31 for attaching the intake duct 200 become unnecessary even if the rear cover 27 that can have the intake duct 200 attached is used, therefore increase of the size of the outline never occurs and an excellent installing manner can be secured.

Moreover, since the inside of the intake duct 200 and the surrounding space of the electric parts such as the rectifier 24 etc. exclusively communicate together in the internal space of the rear cover 27, the cooling air introduced from the intake duct 200 into the internal space of the rear cover 27 can be applied directly to the electric parts such as the rectifier 24 etc.

As a result, the ventilation resistance can be decreased compared with the case where another rear cover etc. is existed therebetween, and the cooling efficiency can be raised further.

In addition, since the amount of the cooling air can be increased, the cooling efficiency can be raised further. Moreover, since the number of parts can be decreased, the cost, including the number of assembly processes, can be decreased.

By the way, although a single dividing wall 33 that divides the internal space of the intake duct connecting portion 32 into two is disposed in the rear cover 27 mentioned above, more than two dividing walls 33 may be disposed.

Figure 7:
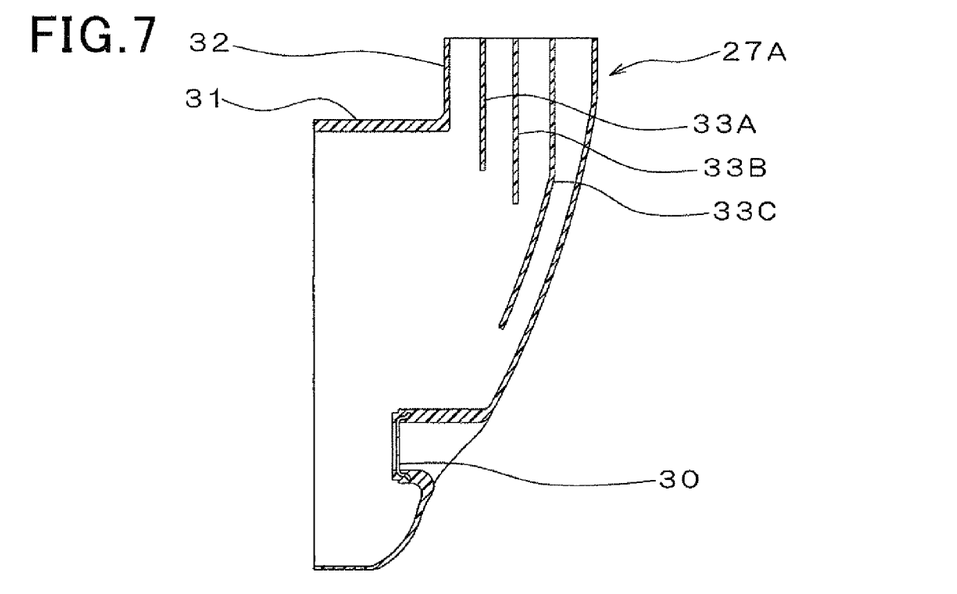
FIG. 7 shows a cross sectional view of a modified rear cover.

FIG. 7 shows a cross sectional view of a modified rear cover. In the rear cover 27A shown in FIG. 7, three dividing walls 33A, 33B and 33 C that divides the internal space of the tip portion of the intake duct connecting portion 32 into four are disposed.

By increasing the number of dividing walls, an entire rigidity of the rear cover 27A including the intake duct connecting portion 32 can be improved and a reliability against vibration can be improved.

Moreover, the dividing walls 33A, 33B and 33C are arranged in this order from a side near the electric parts such as the rectifier 24 etc., and each dividing wall 33A, 33B and 33C is arranged extending into the opening from the tip portion of the intake duct connecting portion 32 as it extends from the electric parts such as the rectifier 24 etc.

That is, compared with the dividing wall 33A that is the nearest to the rectifier 24 etc., a tip portion of the dividing wall 33B that is the next nearest to the rectifier 24 etc. extends deeper into the internal space of the rear cover 27A, and a tip portion of the dividing wall 33C that is the least nearest to the rectifier 24 etc. extends deepest into the internal space of the rear cover 27A.

As described above, the cooling air can be introduced to the entire electric parts such as the rectifier 24 etc. much more evenly by lengthening each depth size of the dividing wall 33A and 33B and 33C as it extends from the electric parts, thus raises the cooling efficiency further.

Moreover, in the rear covers 27 and 27A mentioned above, single or the plurality of dividing walls 33, etc. are used for introducing the cooling air for the entire electric parts as evenly as possible when taking the cooling air from the opening tip of the intake duct connecting portion 32 to inside.

However, since a temperature distribution of the rectifier 24 etc. is not uniform, and a high temperature part and a low temperature part (non-high temperature part) exist together, it is preferable to concentrate the cooling air to the high temperature part actively.

In general, the temperature of a rectifying device, which is a heat source, is higher than that of the heat sink, and there are temperature differences between a plurality of rectifying devices also.

For this, guiding members that guide the flow of the cooling air introduced from the intake duct 32 along the dividing wall 33 etc. may be added to the rear cover 27 etc.

Figure 8:
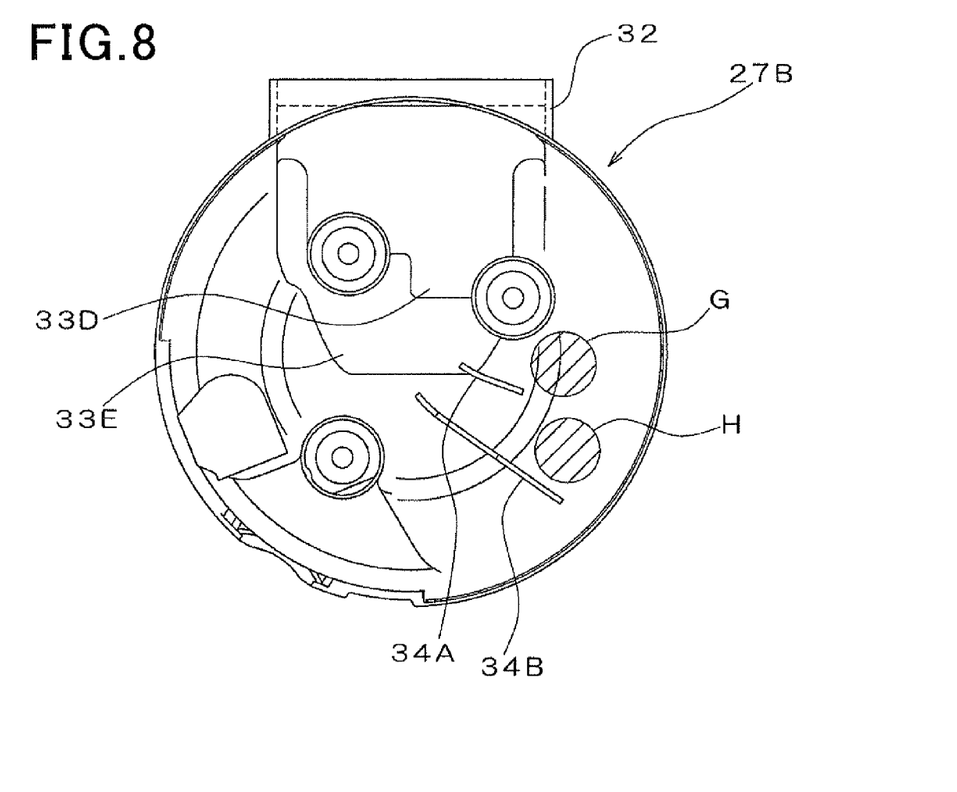
FIG. 8 shows a back side view of the modified rear cover where guiding members are added.
Figure 9:
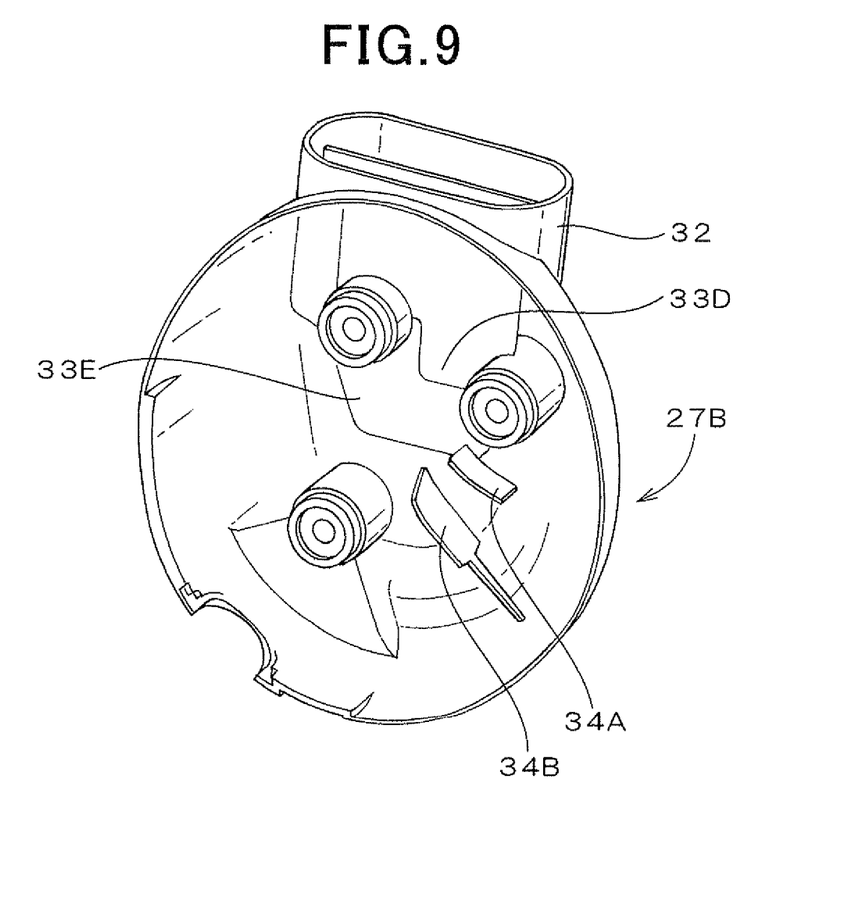
FIG. 9 shows a perspective view of the rear cover where the guiding members are added.

FIG. 8 shows a back side view of the modified rear cover where the guiding members are added, and FIG. 9 shows a perspective view of the rear cover where the guiding members are added.

In the rear cover 27B shown in FIG. 8 and FIG. 9, two dividing walls 33D and 33E that divide the internal space of the tip of the intake duct connecting portion 32 are provided as well as two guiding members 34A and 34B that have surfaces parallel to the rotating shaft 14 are added.

The guiding members 34A and 34B are for concentrating the cooling air that is guided along the dividing walls 33D and 33E inside the intake duct connecting portion 32 to the high temperature part, and it is assumed that areas marked by G and H in FIG. 8, for example, are the areas corresponding to the high temperature part of the rectifier 24.

Moreover, when the cooling air is guided to the high temperature part, it is preferable that the guiding members 34A and 34B are not only added but also to devise shapes of the dividing walls 33D and 33E that guide the cooling air to the guiding members 34A and 34B.

Thus, the high temperature part of the rectifier 24 etc. can be cooled preferentially by the addition of the guiding members 34A and 34B, and coolability can be improved further.

In addition, the pulley 19 has the one-way clutch mechanism that transmits the driving force only in a direction of the rotational force from the engine.

As a result, when the rotational speed of the pulley 19 is slower than the rotational speed of the rotor 10, the clutch is detached and the rotational speed of the rotor 10 remains fast. Therefore, an average rotational speed of the rotor 10 increases compared with a usual solid pulley, and the amount the cooling air taken increases, thus coolability can be improved further.

Although the AC generator 100 is disclosed as the embodiment in the present disclosure, it is not limited to this and may be applicable to the electric rotating machine for vehicles such as a motor-generator that can operate as an electric motor with a rectifying device used for a rectifier having not only a rectification function but also a device having a switching function.

In this case, a similar effect can be achieved.

According to the present disclosure as mentioned above, since the cooling air taken from the intake duct 200 can be introduced into the internal space by disposing the dividing wall 33 etc., it becomes possible to apply the cooling air to the entire electric parts such as the rectifier 24 etc., covered by the rear cover 27 etc., thus the cooling efficiency can be improved.

What is claimed is:

1. A cooling system of an electric rotating machine for vehicles comprising:
    a stator around which a stator winding is wound;
    a rotor that is arranged in an inner circumferential side of the stator;
    a rectifier that converts an alternating current voltage generated in the stator winding into direct current; and
    a protecting cover that covers the rectifier; wherein,
    the protecting cover has an intake duct connecting portion that projects outside in a radial direction relative to a rotating shaft of the rotor;
    an air intake duct is attached to a tip portion of the intake duct connecting portion;
    a dividing wall that extends into an opening from the tip portion of the intake duct connection portion as the intake duct connecting portion extends from the rectifier, and the dividing wall extends in a plane perpendicular to the axial direction, and that divides an internal space of the protecting cover into two adjoining spaces along an axial direction extending backwardly from the rectifier; and
    a cooling fan that rotates together with the rotor, the rotation of the cooling fan generating a negative pressure in the internal space to introduce cooling air into the internal space from the intake duct and along the dividing wall.

2. The cooling system of the electric rotating machine for vehicles according to claim 1,
    the protecting cover has a plurality of fixing seats arranged in a plurality of places further inside in a radial direction than a surrounding wall of the protecting cover.

3. The cooling system of the electric rotating machine for vehicles according to claim 1,
    an inside of the intake duct and a surrounding space of the rectifier exclusively communicate together in the internal space of the protecting cover.

4. The cooling system of the electric rotating machine for vehicles according to claim 1, wherein,
    a plurality of parallel dividing walls is formed.

5. The cooling system of the electric rotating machine for vehicles according to claim 4, wherein,
    each of the plurality of dividing walls is arranged extending into the opening from the tip portion of the intake duct connecting portion as it extends from the rectifier.

6. The cooling system of the electric rotating machine for vehicles according to claim 1, wherein,
    the protecting cover has a guiding member that guides a flow of cooling air introduced from the intake duct along the dividing wall.

7. The cooling system of the electric rotating machine for vehicles according to claim 1, wherein,
    a rotational force from a vehicle engine is transmitted to a pulley of the rotor through a belt, and
    the pulley has a one-way clutch mechanism therein that transmits a driving force only in a direction of the rotational force from the engine.

* * * * *